(12) United States Patent
Kim et al.

(10) Patent No.: US 7,235,334 B2
(45) Date of Patent: Jun. 26, 2007

(54) ELECTROLYTE FOR LITHIUM ION RECHARGEABLE BATTERY AND LITHIUM ION RECHARGEABLE BATTERY INCLUDING THE SAME

(75) Inventors: Jin Hee Kim, Seoul (KR); Jin Sung Kim, Cheonan-si (KR); Yong Shik Kim, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 2 days.

(21) Appl. No.: 11/155,596

(22) Filed: Jun. 20, 2005

(65) Prior Publication Data

US 2005/0287442 A1    Dec. 29, 2005

(30) Foreign Application Priority Data

Jun. 21, 2004   (KR) ...................... 10-2004-0046273
Oct. 26, 2004   (KR) ...................... 10-2004-0085692

(51) Int. Cl.
*H01M 10/40* (2006.01)
(52) U.S. Cl. .................. 429/325; 429/231.95; 429/326
(58) Field of Classification Search ................ 429/324, 429/231.95, 200, 331, 332, 188, 306, 307, 429/322, 326, 325, 329, 231.8
See application file for complete search history.

(56) References Cited

U.S. PATENT DOCUMENTS

| | | | |
|---|---|---|---|
| 6,379,846 B1 | 4/2002 | Terahara et al. | |
| 6,506,524 B1 | 1/2003 | McMillan et al. | |
| 6,514,640 B1 * | 2/2003 | Armand et al. | 429/231.1 |
| 2005/0233222 A1 * | 10/2005 | Yanagida et al. | 429/324 |
| 2006/0121356 A1 * | 6/2006 | Jan et al. | 429/331 |

FOREIGN PATENT DOCUMENTS

| | | |
|---|---|---|
| KR | 10-2001-0014516 | 2/2001 |
| KR | 1020010030178 | 4/2001 |
| KR | 10-2001-0082014 | 8/2001 |
| WO | WO0025381 | 5/2000 |

* cited by examiner

*Primary Examiner*—Patrick Ryan
*Assistant Examiner*—Monique Wills
(74) *Attorney, Agent, or Firm*—H.C. Park & Associates, PLC

(57) ABSTRACT

The present invention is an electrolyte for a lithium ion rechargeable battery and a lithium ion rechargeable battery that includes the same. More particularly, the present invention discloses an electrolyte for a lithium ion rechargeable battery that provides excellent cycle life characteristics and high-temperatures storage stability and prevents a drop in discharge capacity of a battery at low temperature, and a lithium ion rechargeable battery including the same. The lithium ion rechargeable battery including the electrolyte provides improved cycle life characteristics and prevents the problems of a drop in discharge capacity at low temperature and high-temperature swelling through the formation of a stable SEI film at the initial charge cycle.

24 Claims, 1 Drawing Sheet

ELECTROLYTE FOR LITHIUM ION RECHARGEABLE BATTERY AND LITHIUM ION RECHARGEABLE BATTERY INCLUDING THE SAME

CROSS REFERENCE TO RELATED APPLICATION

This application claims priority to and the benefit of Korean Patent Application Nos. 2004-0046273, filed on Jun. 21, 2004 and 2004-0085692 filed on Oct. 26, 2004, which are hereby incorporated by reference for all purposes as if fully set forth herein.

BACKGROUND OF THE INVENTION

1. Field of the Invention

The present invention relates to an electrolyte for a lithium ion rechargeable battery and a lithium ion rechargeable battery that includes the electrolyte. In particular, the present invention provides an electrolyte for a lithium ion rechargeable battery that provides excellent cycle life characteristics and high-temperature storage stability. The electrolyte also prevents a drop in discharge capacity of a battery at low temperatures. The present invention also provides a lithium ion rechargeable battery that includes the electrolyte.

2. Description of the Prior Art

As the electronics industry has advanced, technical research into portable and wireless electronic instruments including telephones, video cameras, and personal computers has progressed rapidly. Accordingly, a small rechargeable battery that is lightweight and has high energy density is increasingly in demand to power these instruments. Particularly, a rechargeable battery that has a non-aqueous electrolyte and uses a lithium-containing metal oxide as a cathode active material and a carbonaceous material capable of lithium intercalation/deintercalation as an anode active material to provide a voltage of about 4 V fills these requirements.

Lithium ion rechargeable batteries have an average discharge voltage of about 3.6 to 3.7 V and thus can provide relatively high electric power compared to other alkali batteries, Ni—MH batteries, Ni—Cd batteries, etc. However, in order to obtain such a high drive voltage level, an electrolyte composition that is electrochemically stable in the charge/discharge voltage range of 0 to 4.2V is required. For this reason, a mixture containing a cyclic carbonate-based solvent such as ethylene carbonate, propylene carbonate, and butylene carbonate, for example, is generally used as an electrolyte.

During the initial charge cycle of a lithium ion rechargeable battery, lithium ions are discharged from a lithium metal oxide, which is the cathode active material, and move toward a carbon electrode, which is the anode, so that lithium ion intercalation into carbon can be made. During this process, the lithium may react with the carbon electrode to produce $Li_2CO_3$, $Li_2O$, LiOH, etc., thereby forming a film on the surface of the anode. Such a film is referred to as a Solid Electrolyte Interface (SEI) film.

After the SEI film is formed at the initial charge cycle, it serves as a barrier for preventing lithium ions from reacting with the carbon anode or other substances and also forms an ion tunnel during the following charge/discharge cycles. The ion tunnel prevents collapse of the carbon anode that is caused by the dissolving lithium ions in high-molecular weight organic solvents that are present in the electrolyte. It also prevents the movement of lithium ions with the solvents, which results in intercalation into the carbon anode. Therefore, once the SEI film is formed, lithium ions are prevented from reacting with the carbon anode again or from undesirably reacting with other substances. Thus the concentration of lithium ions can be maintained constant.

However, as charge and discharge cycles repeat electrode plates repeatedly expand and shrink and local over-voltage may be applied. Under these circumstances, a passivation layer such as an SEI film may be gradually degraded with the lapse of time and the surface of the anode may be exposed and may undesirably react with the surrounding electrolyte. In addition, gases are generated from the undesired side-reaction, which thereby increases the internal pressure of the battery and significantly degrades the cycle life characteristics of a battery. The gases that are generated mainly include CO, $CO_2$, $CH_4$, $C_2H_6$, etc., depending on the kind of the carbonate used in the electrolyte and the type of anode active material (J. Power Sources, 72 (1998) p. 66–70).

Additionally, a certain graphite-based anode active material may cause the decomposition of a carbonate-based electrolyte and the separation of a carbonaceous material, thereby detracting from characteristics of a battery including electric capacity, cycle life characteristics and storage characteristics. Particularly, such problems are exacerbated for batteries that use an electrolyte that contains propylene carbonate. Propylene carbonate is decomposed at an anode during the first charge cycle, thereby decreasing the initial capacity significantly.

In order to prevent the decomposition of cyclic carbonates and the separation of carbonaceous materials caused by graphite-based anode active materials, a method of adding a crown ether (12-crown-4) to an electrolyte based on propylene carbonate and ethylene carbonate has been suggested (J. Electrochem. Soc., Vol. 140, No. 6, L101 (1993)). However, this method is problematic in that a large amount of expensive crown ether is needed to prevent the decomposition of cyclic carbonates to a desired degree, and the battery characteristics obtained by the method are not sufficient for practical use.

Additionally, Japanese Patent Laid-Open No. Hei 8-45545 discloses a method of adding vinylene carbonate to an electrolyte based on propylene carbonate and ethylene carbonate in order to prevent decomposition of the electrolyte. According to the method, vinylene carbonate is reduced at an anode during charge cycles to form an insoluble film on the surface of graphite (anode), thereby preventing reduction of solvents such as propylene carbonate and ethylene carbonate.

However, this method using vinylene carbonate alone cannot accomplish the formation of a complete SEI film at the first charge cycle. As charge and discharge cycles are repeated at room temperature, the film may crack and vinylene carbonate is decomposed and consumed again in order to compensate for such cracked portions. Ultimately, it is not possible to obtain stable cycle life characteristics of a battery. Further, although cycle life characteristics of a battery may improve by increasing the amount of vinylene carbonate, the method still has problems in that the discharge capacity of a battery decreases rapidly at low temperature and swelling of a battery may occur when it is stored at high temperature.

SUMMARY OF THE INVENTION

The present invention provides an electrolyte for a lithium ion rechargeable battery that provides excellent cycle life characteristics and high-temperature storage stability and also prevents a drop in discharge capacity of a battery at low temperature.

The present invention also provides a lithium ion rechargeable battery that includes the electrolyte.

Additional features of the invention will be set forth in the description which follows, and in part will be apparent from the description, or may be learned by practice of the invention.

The present invention discloses an electrolyte for a lithium rechargeable battery that includes a lithium salt, a non-aqueous organic solvent, and a first additive that has a Lowest Unoccupied Molecular Orbital (LUMO) level between 0.3 eV and 0.5 eV when calculated by the AM1 (Austin Model 1) method among the quantum chemical calculation methods. The electrolyte also includes a second additive that has an LUMO level of between −0.2 eV and 0.3 eV or between 0.5 eV and 1.0 eV when calculated by the AM1 method.

The present invention also discloses an electrolyte for a lithium rechargeable battery that includes a lithium salt, a non-aqueous organic solvent, and a first additive that has an LUMO level of between 0.3 eV and 0.5 eV when calculated by the AM1 method among the quantum chemical calculation methods. The electrolyte also includes a second additive that has an LUMO level of between 0.5 eV and 1.0 eV when calculated by the AM1 method, and a third additive that has an LUMO level of between −0.2 eV and 0.3 eV when calculated by the AM1 method.

The present invention also discloses a lithium ion rechargeable battery that includes the above-described electrolyte, a cathode containing a cathode active material, an anode containing an anode active material, and a separator disposed between the cathode and the anode.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE PREFERRED EMBODIMENTS

Figure 1:
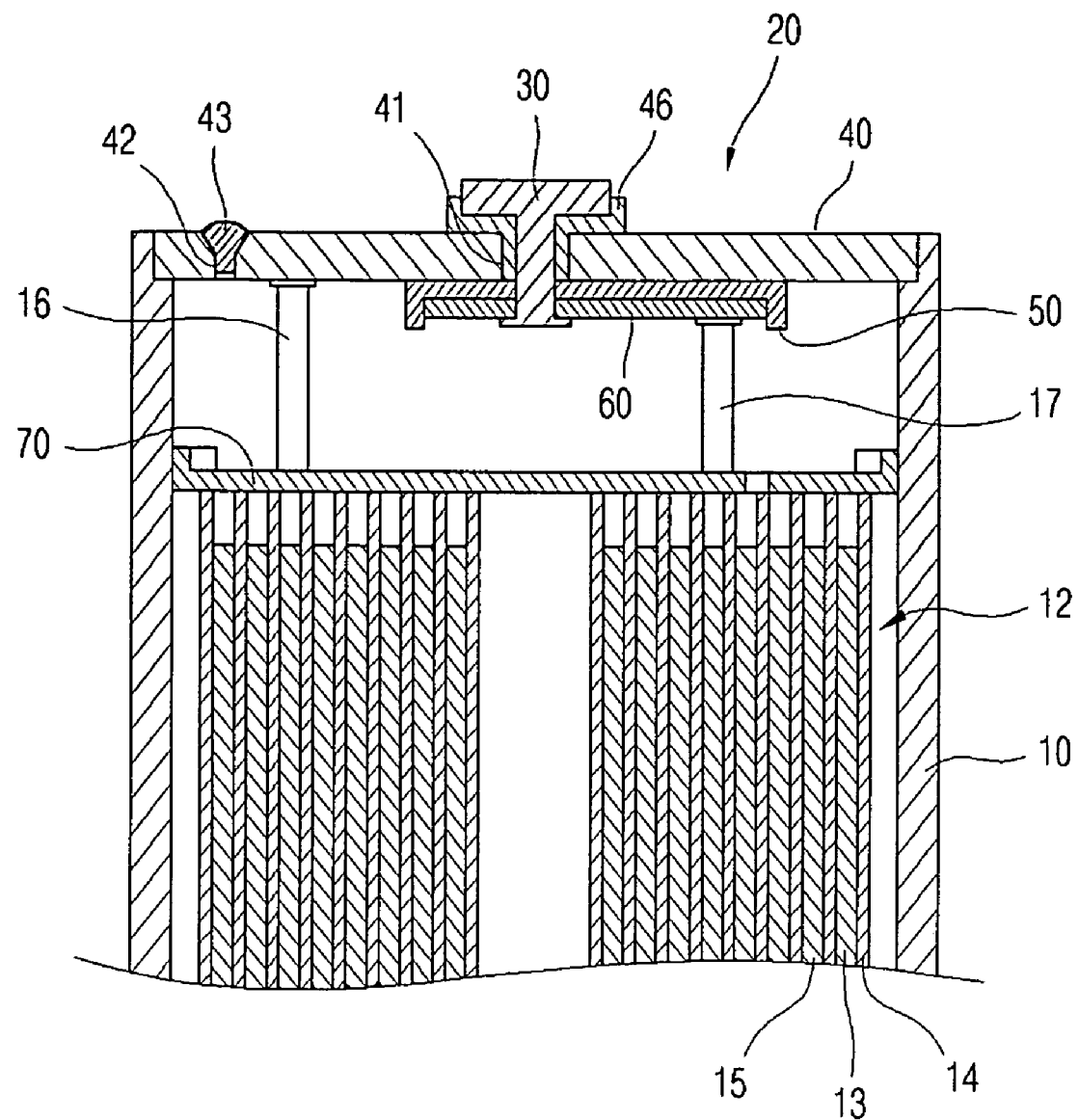
FIG. 1 is a schematic view that shows the structure of a lithium ion rechargeable battery according to a preferred embodiment of the present invention.

In order to form a strong SEI film, an additive that can be reduced and decomposed before a non-aqueous organic solvent is reduced is required. The Lowest Unoccupied Molecular Orbital (LUMO) theory is applied to select such an additive. The LUMO level of a compound added to an electrolyte is obtained by using the Austin Model 1 (AM1) method, which is a semi-empirical computation method.

Semi-empirical computation methods are classified into AM1, Parametric Method 3 (PM3), Modified Neglect of Differential Overlap (MNDO), Complete Neglect of Differential Overlap (CNDO), Intermediate Neglect of Differential Overlap (INDO), Modified Intermediate Neglect of Differential Overlap (MINDO), etc., depending on postulations and parameters. The AM1 method was developed by Dewer et al. in 1985 for calculations in hydrogen bonding through a partial modification and improvement in the MNDO method. The AM1 method applied to the present invention is available as the MOPAC computer program package.

The LUMO represents a molecular orbital function of the lowest-energy level orbital unoccupied by electrons. When a given molecule accepts an electron, the electron occupies the lowest-energy level orbital and the reduction degree is determined by the energy level. The lower the LUMO level is, the higher the reduction degree is. On the other hand, a relatively high LUMO level indicates high resistance against reduction.

Therefore, the electrolyte according to the present invention includes an organic compound that has a LUMO level that is lower than the LUMO level of the currently used non-aqueous organic solvent. This allows for stable cycle life characteristics of a battery. In particular, the present invention includes an organic compound that is reduced to form a stable film before a carbonate-based solvent having the LUMO level of between 1 eV and 2 eV is reduced.

As described hereinbefore, the electrolyte according to the present invention includes a first additive having a LUMO level of between 0.3 eV and 0.5 eV and a second additive having an LUMO level of between −0.2 eV and 0.3 eV or between 0.5 eV and 1.0 eV. If the LUMO level of the additive is higher than 1.0 eV or lower than −0.2 eV, unstable film is formed by a carbonate-based solvent.

Each of the first and the second additives used in the electrolyte according to the present invention has an LUMO level that is less than the LUMO level of a conventional non-aqueous organic solvent, where the conventional LUMO level has a potential between about 1 eV and 2 eV. Additionally, the potential difference between a non-aqueous organic solvent and the first and second additives is preferably 0.05 eV to 3 eV and more preferably 0.1 eV to 2 eV.

When the additives are not used, a battery may have good electrochemical charge/discharge efficiency due to a relatively low irreversible capacity needed for film formation. However, a stable SEI film cannot be formed, thereby deteriorating the battery quality during repeated charge and discharge cycles and detracting from the battery cycle life.

When the second additive is used alone, the cycle life of a battery improves but it should be added in a concentration of 3 wt % or more so that it can form a stable SEI film at the initial charge cycle. In this case, the problems are that the discharge capacity of a battery decreases at low temperatures (−20° C. to 0° C.) and the battery may swell when it is stored at high temperatures (85° C. to 90° C.). In addition, as charge and discharge cycles repeat, the electrode plates repeatedly expand and shrink and local over-voltage may be applied, thereby degrading an SEI film and causing undesired side-reactions. This makes it difficult to ensure satisfactory cycle life characteristics.

The first additive may include trimethylsilyl phosphate and lithium tetrafluoroborate ($LiBF_4$), for example. The second additive may include vinylene carbonate and fluoroethyl carbonate.

The electrolyte of the present invention, which includes a first additive and a second additive mixed in a suitable ratio can form a stable SEI film at the initial charge cycle, and thus can ensure high-temperature stability, excellent cycle life characteristics and stable low-temperature discharge capacity of a battery.

In particular, the electrolyte according to the present invention uses the first additive to form a stable SEI film at the initial charge cycle. Therefore, even if the concentration of the second additive is decreased, the first additive can maintain cycle life characteristics of a battery and ensure stable low-temperature discharge capacity and high-temperature stability of a battery. Ultimately, it is possible to obtain all of the above-described characteristics at the same time, unlike in the case in which the second additive is used alone.

The electrolyte according to the present invention includes the first additive preferably at a concentration of 0.01 wt % to 3 wt % and more preferably at a concentration of 0.2 wt % to 0.5 wt %, based on the total weight of the electrolyte.

When the first additive has a concentration of less than 0.01 wt %, it is not possible to form a stable SEI film. When the amount of the first additive is greater than 3 wt %, a battery may swell significantly while stored at high temperature for a long time. In addition, the low-temperature discharge capacity as well as initial capacity decreases. Since a large amount of the first additive is consumed, a thick SEI film is formed. Further, an excessive amount of the first additive that remains unreacted may decompose when a battery is stored at high temperature, or may it function as a resistor during a discharge cycle at low temperature, resulting in deterioration of battery quality.

The electrolyte according to the present invention includes the second additive preferably at a concentration of 0.01 wt % to 20 wt %, more preferably at a concentration of 0.01 wt % to 10 wt %, and most preferably at a concentration of 0.1 wt % to 5 wt %, based on the total weight of the electrolyte.

When the concentration of the second additive is less than 0.01 wt %, it is not possible to form a stable SEI film. When the amount of the second additive is greater than 20 wt %, the low-temperature discharge capacity of a battery decreases significantly, a battery may swell while stored at high temperature, and its cycle life may shorten.

The weight ratio of the first additive to the second additive preferably ranges from 0.1:1 to 1:1, and more preferably from 0.2:1 to 0.5:1. When the weight ratio of the first additive to the second additive is less than 0.1, the cycle life of a battery decreases. When the weight ratio of the first additive to the second additive is greater than 1.0, the low-temperature discharge capacity and initial capacity of a battery decrease, and it may swell significantly at a high-temperature.

The electrolyte according to the present invention includes a non-aqueous organic solvent and a lithium salt, in addition to the above additives. The non-aqueous organic solvent functions as a medium through which ions participating in chemical reactions in a battery can move. The non-aqueous organic solvent may include, but is not limited to, cyclic carbonates, non-cyclic carbonates, aliphatic carboxylic acid esters, non-cyclic ethers, cyclic ethers, alkyl phosphate esters and fluorides thereof, or a mixture containing two or more of them.

Examples of the cyclic carbonates may include, but are not limited to, ethylene carbonate, propylene carbonate, butylene carbonate, and vinylene carbonate. Examples of the non-cyclic carbonates include dimethyl carbonate, diethyl carbonate, ethyl methyl carbonate, methyl propyl carbonate, ethyl propyl carbonate, dipropyl carbonate, and methyl ethyl carbonate, for example. Further, examples of the aliphatic carboxylic acid esters may include but are limited to methyl formate, methyl acetate, methyl propionate, and ethyl propionate, for example.

In addition, examples of the non-cyclic ethers may include gamma-lactones, 1,2-dimethoxyethane, 1,2-diethoxyethane, and ethoxymethoxyethane. Examples of the cyclic ethers may include, for example tetrahydrofuran and 2-methyltetrahydrofuran. Examples of the alkyl phosphate esters include dimethyl sulfoxide, 1,2-dioxolan, trimethyl phosphate, triethyl phosphate, and trioctyl phosphate.

The lithium salt provides lithium ions in a battery and empowers a lithium ion rechargeable battery to perform basic functions. The lithium salt that may be used may include, but is not limited to, $LiPF_6$, $LiBF_4$, $LiAsF_6$, $LiClO_4$, $LiCF_3SO_3$, $LiSbF_6$, $LiN(SO_2CF_3)_2$, $LiC_4F_9SO_3$, $LiAlF_4$, $LiAlCl_4$, $LiN(SO_2C_2F_5)_2$, $LiN(C_xF_{2x+1}SO_2)(C_yF_{2y+1}SO_2)$ (where x and y are integers), LiCl and LiI, or a mixture containing two or more of them.

In another embodiment of the present invention, the electrolyte includes a first additive that has a LUMO level of between 0.3 eV and 0.5 eV when calculated by the AM1 method, a second additive that has a LUMO level of between 0.5 eV and 1.0 eV when calculated by the AM1 method, and a third additive that has a LUMO level of between −0.2 eV and 0.3 eV when calculated by the AM1 method.

The lithium rechargeable battery that uses the electrolyte according to present invention includes a cathode, an anode, and a separator. The cathode includes a cathode active material that is capable of reversible lithium ion intercalation/deintercalation. Such cathode active materials may include a lithiated intercalation oxide.

The anode includes an anode active material that is capable of lithium ion intercalation/deintercalation. Such anode active materials may include, but are not limited to, crystalline or amorphous carbon, carbonaceous anode active materials derived from carbon composites (pyrolyzed carbon, coke, graphite), burned organic polymer compounds, carbon fiber, tin oxide compounds, lithium metal and lithium alloys.

Preferably, the anode active material is crystalline carbon. More preferably, the anode active material is crystalline carbon or graphite having a crystalline size in the lamination direction (Lc) of 150 Å or more, particularly of between 150 Å and 3000 Å, d(002) of between 3.35 Å and 3.38 Å, real density of 2.2 g/cm$^3$ or more, particularly of between 2.2 g/cm$^3$ and 2.3 g/cm$^3$, BET specific surface area of between 0.5 m$^2$/g and 50 m$^2$/g, and average particle particle diameter (D50) of between 1 μm. Additionally, in the above active material, the intensity ratio of I(1360) surface to I(1590) surface in the Raman spectrum, i.e., I(1360 cm$^{-1}$)/I (1590 cm$^{-1}$) is preferably 0.05 or more, and more preferably between 0.05 and 0.5. Further, the peak intensity ratio of I(110) surface to I(002) surface in the X-ray diffraction pattern, i.e., X(I(110)/I(002)) is preferably less than 0.2, and more preferably is 0.006 to 0.2.

A slurry containing the cathode active material or anode active material is coated on a collector formed of metal foil. Otherwise, the active material itself is applied as a film.

The separator, which prevents a short circuit between the cathode and the anode in a lithium rechargeable battery, may include any materials known to one skilled in the art. For example, the separator may comprise a polymer film such as a polyolefin, polypropylene or polyethylene film, a multi-layered film thereof, a microporous film, woven web, and non-woven web.

The lithium rechargeable battery as described above may also be formed into a unit cell that has the structure of cathode/separator/anode, a bi-cell having the structure of cathode/separator/anode/separator, or a laminate cell in which the structure of unit cell is repeated several times.

Hereinafter, a preferred embodiment of the present invention will be described with reference to the accompanying drawing.

FIG. 1 shows the structure of a lithium ion rechargeable battery according to a preferred embodiment of the present invention. As shown in FIG. 1, the lithium rechargeable battery is obtained by forming an electrode assembly 12 including a cathode 13, an anode 15, and a separator 14 that is interposed between the cathode 13 and the anode 15 in a can 10. In addition, the battery includes an electrolyte, and a cap assembly 20 that seals the top of the can. The cap assembly 20 includes a cap plate 40, an insulating plate 50, a terminal plate 60 and an electrode terminal 30. Additionally, the cap assembly 20 is coupled with an insulation case 70 to seal the can 10.

The electrode terminal 30 is inserted into a through hole 41 formed at the center of the cap plate 40. When the electrode terminal 30 is inserted into the through hole 41, a gasket 46 is coupled to the outer surface of the electrode terminal 30 to insulate the electrode terminal 30 from the cap plate 40. Thus the gasket is inserted into the through hole 41 along with the electrode terminal 30. After the cap assembly is mounted on the top of the cap 10, the electrolyte is injected through an inlet 42 and then the inlet 42, is sealed with a stopper 43.

The electrode terminal 30 is connected to an anode tab 17 of the anode 15 or to a cathode tab 16 of the cathode 13, thereby functioning as an anode terminal or a cathode terminal.

The lithium rechargeable battery according to the present invention is not limited to the above-described shape but may have any other shape applicable to a battery, including a cylindrical shape, pouch shape, etc.

The present invention will now be described using the following examples. It is to be understood that the following examples are only illustrative and the present invention is not limited thereto.

The LUMO levels of non-aqueous organic solvents of Reference Examples 1 to 6 and Additives 1 to 4 added to the non-aqueous organic solvents were measured using the AM1 method. The results are shown in the following Table 1.

TABLE 1

| No. | Chemical Substance | LUMO (eV) |
|---|---|---|
| Ref. Ex. 1 | EC (Ethylene Carbonate) | 1.17553 |
| Ref. Ex. 2 | PC (Propylene Carbonate) | 1.23594 |
| Ref. Ex. 3 | DMC (Dimethyl Carbonate) | 1.24846 |
| Ref. Ex. 4 | DEC (Diethyl Carbonate) | 1.25499 |
| Ref. Ex. 5 | EMC (Ethylmethyl Carbonate) | 1.28819 |
| Ref. Ex. 6 | GBL (γ-Butyrolactone) | 1.04899 |
| Additive 1 | FEC (Fluoro Ethyl Carbonate) | 0.905 |
| Additive 2 | $LiBF_4$ (Lithium Tetrafluoroborate) | 0.2 |
| Additive 3 | TMSP (Trimethylsilyl Phosphate) | 0.415 |
| Additive 4 | VC (Vinylene Carbonate) | 0.09007 |

As shown in Table 1, Additives 1 to 4 have a reduction potential that is lower than reduction potentials of Reference Examples 1 to 6. Thus they decompose before the non-aqueous organic solvents of Reference Examples 1 to 6.

EXAMPLE 1

An anode active material made of artificial graphite was suspended in aqueous carboxymethyl cellulose solution. Styrene-butadiene rubber was added thereto as a binder to form slurry of anode active material. The slurry was coated on a 10 μm thick copper foil, dried and rolled to form an anode.

A cathode active material comprising $LiCoO_2$ was combined with polyvinylidene fluoride as a binder and carbon as a conductive agent. These compounds were dispersed in N-methyl-2-pyrrolidone as a solvent in a weight ratio of 92:4:4 to form slurry of cathode active material. The slurry was coated on a 15 μm thick aluminum foil, dried and rolled to form a cathode.

The cathode and the anode were then wound and compressed together with a polyethylene separator with a thickness of 16 μm. The resultant unit cell was inserted into a prismatic can. Next, an electrolyte was added to the can to form a lithium rechargeable battery. The electrolyte was prepared by adding 1.0M of $LiPF_6$ to a mixed solvent comprising ethylene carbonate, ethylmethyl carbonate and dimethyl carbonate in a volume ratio of EC:EMC:DMC=3:6:1. In addition, lithium tetrafluoroborate and fluoroethyl carbonate were to the added electrolyte mixture in the amount of 0.2 wt % and 2.0 wt %, respectively, based on the weight of the mixture.

EXAMPLE 2

Example 1 was repeated, except that 1.0 wt % of lithium tetrafluoroborate and 2.0 wt % of fluoroethyl carbonate, based on the weight of the mixture were added.

EXAMPLE 3

Example 1 was repeated, except that 0.5 wt % of trimethylsilyl phosphate and 2.0 wt % of fluoroethyl carbonate, based on the weight of the mixture were added.

EXAMPLE 4

Example 1 was repeated, except that 1.0 wt % of trimethylsilyl phosphate and 2.0 wt % of fluoroethyl carbonate, based on the weight of the mixture were added.

EXAMPLE 5

Example 1 was repeated, except that 0.2 wt % of lithium tetrafluoroorate, 0.5 wt % of trimethylsilyl phosphate and 2.0 wt % of fluoroethyl carbonate, based on the weight of the mixture were added.

EXAMPLE 6

Example 1 was repeated, except that 0.2 wt % of lithium tetrafluoroborate and 2.0 wt % of vinylene carbonate, based on the weight of the mixture were added.

EXAMPLE 7

Example 1 was repeated, except that 1.0 wt % of lithium tetrafluoroborate and 2.0 wt % of vinylene carbonate, based on the weight of the mixture were added.

EXAMPLE 8

Example 1 was repeated, except that 0.5 wt % of trimethylsilyl phosphate and 2.0 wt % of vinylene carbonate, based on the weight of the mixture were added.

EXAMPLE 9

Example 1 was repeated, except that 1.0 wt % of trimethylsilyl phosphate and 2.0 wt % of vinylene carbonate, based on the weight of the mixture were added.

EXAMPLE 10

Example 1 was repeated, except that 0.2 wt % of lithium tetrafluoroorate, 0.5 wt % of trimethylsilyl phosphate and 2.0 wt % of vinylene carbonate, based on the weight of the mixture were added.

EXAMPLE 11

Example 1 was repeated, except that 0.2 wt % of lithium tetrafluoroorate, 0.5 wt % of vinylene carbonate and 1.5 wt % of fluoroethyl carbonate, based on the weight of the mixture were added.

EXAMPLE 12

Example 1 was repeated, except that 1.0 wt % of lithium tetrafluoroorate, 0.5 wt % of vinylene carbonate and 1.5 wt % of fluoroethyl carbonate, based on the weight of the mixture were added.

EXAMPLE 13

Example 1 was repeated, except that 0.5 wt % of trimethylsilyl phosphate, 0.5 wt % of vinylene carbonate and 1.5 wt % of fluoroethyl carbonate, based on the weight of the mixture were added.

EXAMPLE 14

Example 1 was repeated, except that 0.2 wt % of trimethylsilyl phosphate, 0.5 wt % of vinylene carbonate and 1.5 wt % of fluoroethyl carbonate, based on the weight of the mixture were added.

EXAMPLE 15

Example 1 was repeated, except that 0.2 wt % of lithium tetrafluoroborate, 0.5 wt % of trimethylsilyl phosphate, 0.5 wt % of vinylene carbonate and 1.5 wt % of fluoroethyl carbonate, based on the weight of the mixture were added.

COMPARATIVE EXAMPLE 1

Example 1 was repeated, except that no additive was added to the electrolyte.

COMPARATIVE EXAMPLE 2

Example 1 was repeated, except that 2.0 wt % of fluoroethyl carbonate based on the weight of the mixture was added.

COMPARATIVE EXAMPLE 3

Example 1 was repeated, except that 5.0 wt % of fluoroethyl carbonate based on the weight of the mixture was added.

COMPARATIVE EXAMPLE 4

Example 1 was repeated, except that 2.0 wt % of vinylene carbonate based on the weight of the mixture was added.

COMPARATIVE EXAMPLE 5

Example 1 was repeated, except that 5.0 wt % of vinylene carbonate based on the weight of the mixture was added.

EXPERIMENTAL EXAMPLE 2

Batteries obtained from Examples 1 to 15 and Comparative Examples 1 to 5 (battery capacity 1C=790 mAh) were charged under constant current-constant voltage (CC-CV) conditions with a current of 158 mA and a voltage of 4.2 V and left for 1 hour. Then, the batteries were discharged at 395 mA to 2.75 V and left for 1 hour. After the above charge/discharge cycle was repeated three times, the batteries were charged at a current of 395 mA for 3 hours to a charge voltage of 4.2 V. Next, the initial charge/discharge efficiency (%), i.e., [(initial discharge capacity−initial charge capacity)/(initial charge capacity)]×100 (%), was calculated. For each of Examples 1 to 15 and Comparative Examples 1 to 5, the discharge capacity/charge capacity ratio at the first charge/discharge cycle was determined by using the average values of 10 cells (as shown) in the following Tables 2 and 3.

In addition, a high-temperature storage test was performed as follows. Each battery was stored for 4 hours at 85° C. Then, the thickness right after storage was compared to the thickness before storage and the thickness increase ratio (%) was calculated by using the formula [(thickness after high-temperature storage−thickness before high-temperature storage)/(thickness before high-temperature storage)]×100 (%).

Further, a cycle life test was performed as follows. Each battery was subjected to 0.1 C cut-off charge and 1 C/3.0V cut-off discharge at each temperature (10° C./25° C./45° C.) under constant current-constant voltage (CC-CV) conditions of 1 C/4.2V. The capacity maintenance (%) at each cycle was calculated by using the formula [(discharge capacity at a given cycle)/(discharge capacity at the first cycle)]×100 (%).

TABLE 2

| Ex. No. | Additive 1 | Additive 2 | Initial Charge/ Discharge Efficiency (%) | Thickness Increase Ratio (%) After Storage at 85° C./4 h | −20° C./0.5 C. Discharge Capacity (%) | Low-temperature (10° C.) Capacity Maintenance (%) at 100th cycle | Room temperature Capacity Maintenance (%) at 300th cycle | High temperature (60° C.) Capacity Maintenance (%) at 300th cycle |
|---|---|---|---|---|---|---|---|---|
| 1 | LiBF$_4$ 0.2 wt % | FEC 2 wt % | 96 | 14 | 59 | 86 | 88 | 83 |
| 2 | LiBF$_4$ 1.0 wt % | FEC 2 wt % | 93 | 15 | 58 | 85 | 87 | 80 |
| 3 | TMSP 0.5 wt % | FEC 2 wt % | 95 | 16 | 60 | 88 | 90 | 79 |
| 4 | TMSP 1.0 wt % | FEC 2 wt % | 94 | 23 | 63 | 89 | 91 | 77 |
| 5 | LiBF$_4$ 0.2 wt % + TMSP 0.5 wt % | FEC 2 wt % | 95 | 17 | 61 | 87 | 93 | 80 |

TABLE 2-continued

| Ex. No. | Additive 1 | Additive 2 | Initial Charge/ Discharge Efficiency (%) | Thickness Increase Ratio (%) After Storage at 85° C./4 h | −20° C./0.5 C. Discharge Capacity (%) | Low-temperature (10° C.) Capacity Maintenance (%) at 100th cycle | Room temperature Capacity Maintenance (%) at 300th cycle | High temperature (60° C.) Capacity Maintenance (%) at 300th cycle |
|---|---|---|---|---|---|---|---|---|
| 6 | LiBF$_4$ 0.2 wt % | VC 2 wt % | 93 | 17 | 40 | 70 | 86 | 73 |
| 7 | LiBF$_4$ 1.0 wt % | VC 2 wt % | 93 | 19 | 38 | 70 | 86 | 70 |
| 8 | TMSP 0.5 wt % | VC 2 wt % | 94 | 20 | 51 | 83 | 86 | 76 |
| 9 | TMSP 1.0 wt % | VC 2 wt % | 92 | 23 | 55 | 86 | 87 | 75 |
| 10 | LiBF$_4$ 0.2 wt % + TMSP 0.5 wt % | VC 2 wt % | 93 | 18 | 53 | 85 | 90 | 80 |
| 11 | LiBF$_4$ 0.2 wt % | VC 0.5 wt % + FEC 1.5 wt % | 94 | 17 | 58 | 87 | 86 | 75 |
| 12 | LiBF$_4$ 1.0 wt % | VC 0.5 wt % + FEC 1.5 wt % | 91 | 20 | 57 | 87 | 87 | 76 |
| 13 | TMSP 0.5 wt % | VC 0.5 wt % + FEC 1.5 wt % | 93 | 21 | 60 | 87 | 88 | 75 |
| 14 | TMSP 1.0 wt % | VC 0.5 wt % + FEC 1.5 wt % | 92 | 23 | 63 | 86 | 90 | 73 |
| 15 | LiBF$_4$ 0.2 wt % + TMSP 0.5 wt % | VC 0.5 wt % + FEC 1.5 wt % | 93 | 19 | 62 | 84 | 89 | 75 |

TABLE 3

| Comp. Ex. No. | Additive 1 | Additive 2 | Initial Charge/ Discharge Efficiency (%) | Thickness Increase Ratio (%) After Storage at 85° C./4 h | −20° C./0.5 C. Discharge Capacity (%) | Low-temperature (10° C.) Capacity Maintenance (%) at 100th cycle | Room temperature Capacity Maintenance (%) At 300th cycle | High temperature (60° C.) Capacity Maintenance (%) At 300th cycle |
|---|---|---|---|---|---|---|---|---|
| 1 | — | — | 97 | 10 | 70 | 40 | 30 | 20 |
| 2 | — | FEC 2 wt % | 96 | 25 | 67 | 83 | 79 | 75 |
| 3 | — | FEC 5 wt % | 95 | 30 | 50 | 80 | 84 | 77 |
| 4 | — | VC 2 wt % | 93 | 28 | 40 | 70 | 82 | 69 |
| 5 | — | VC 5 wt % | 90 | 35 | 30 | 65 | 85 | 63 |

As shown in Table 3, the battery that used no additive in Comparative Example 1 has good electrochemical charge/discharge efficiency due to the lack of irreversible capacity needed for film formation. However, the battery quality was deteriorated during repeated cycles because a stable SEI film was not formed.

Additionally, the batteries of Comparative Examples 2 to 5 that used vinylene carbonate or fluoroethyl carbonate alone as an additive have improved cycle life compared to Comparative Example 1. However, because a stable SEI film was not formed, the SEI film in each battery cracked, followed by decomposition and consumption of vinylene carbonate or fluoroethyl carbonate at the cracked portion. Therefore, a large amount of vinylene carbonate or fluoroethyl carbonate must be added in order to obtain stable battery capacity during repeated cycles. However, as the amount of vinylene carbonate increases, cycle life of a battery may improve, but the battery may swell when stored at high temperatures. In addition, the low-temperature discharge capacity decreases.

When fluoroethyl carbonate was used instead of vinylene carbonate, cycle life of a battery may improve as it did when using vinylene carbonate and the problem of a decrease in discharge capacity at low temperature becomes less serious. However, a drop in discharge capacity at low temperature and high-temperature swelling still remain problems.

As can be seen from Comparative Examples 2 and 3 and Comparative Examples 4 and 5, vinylene carbonate provides a higher room-temperature capacity maintenance (%) than fluoroethyl carbonate. However, when vinylene carbonate is used, the low-temperature discharge capacity significantly decreases and high-temperature swelling increase in proportion to an increase of the amount of vinylene carbonate. Moreover, cycle life characteristics at high temperature and low temperature are poor. When fluoroethyl carbonate is used, high-temperature swelling may occur according to the increase of the amount of fluoroethyl carbonate. However, when vinylene carbonate and fluoroethyl carbonate increase equally, fluoroethyl carbonate provides a smaller drop in low-temperature discharge capacity compared to vinylene carbonate. Ultimately, both fluoroethyl carbonate and vinylene carbonate may cause a high-temperature swelling problem and a drop in low-temperature capacity, as their amounts increase.

As described above, the additive such as vinylene carbonate and fluoroethyl carbonate cannot ensure low-temperature discharge capacity, high-temperature stability and cycle life characteristics of a battery, when used alone.

As shown in Table 2, batteries obtained from Examples 1 to 15 according to the present invention, including at least one first additive selected from the group consisting of lithium tetrafluoroborate and trimethylsilyl phosphate and at least one second additive selected from the group consisting of vinylene carbonate and fluoroethyl carbonate, can improve charge/discharge cycle life characteristics and low-temperature discharge capacity and can solve a high-temperature swelling problem, while decreasing the amount of vinylene carbonate or fluoroethyl carbonate.

As can be seen from Examples 1 to 10, when each of vinylene carbonate and fluoroethyl carbonate is used in the amount reduced to 2.0 wt % and lithium tetrafluoroborate and trimethylsilyl phosphate are added in various amounts, it is possible to obtain room-temperature cycle life characteristics similar to those in the case of using 5.0 wt % of vinylene carbonate or ethylene carbonate.

The addition of lithium tetrafluoroborate also improves cycle life characteristics and detracts from a high-temperature swelling degree, while the addition of trimethyl phosphate improves cycle life characteristics and low-temperature discharge capacity characteristics. In other words, lithium tetrafluoroborate has functions of improving cycle life characteristics and inhibiting high-temperature swelling, while trimethylsilyl phosphate has functions of improving cycle life characteristics and low-temperature discharge capacity characteristics.

However, when the amount of lithium tetrafluoroborate increase above its optimal level, high-temperature swelling becomes serious and both the initial capacity and low-temperature discharge capacity decrease. Similarly, when the amount of trimethylsilyl phosphate increases above its optimal level, high-temperature swelling becomes serious and cycle life characteristics are degraded. Additionally, when lithium tetrafluoroborate and trimethylsilyl phosphate are used excessively, a large amount of these additives is consumed in SEI film formation, thereby forming an undesirably thick film. Moreover, residual additives remaining unreacted during the first charge cycle may be decomposed at high temperature or may function as a resistor upon discharge at low temperature, thereby degrading the battery quality.

Because vinylene carbonate provides excellent room-temperature cycle life characteristics when compared to fluoroethyl carbonate but detracts from low-temperature discharge capacity significantly, it is preferable that a minimized amount of vinylene carbonate is used along with fluoroethyl carbonate in order to improve both cycle life characteristics and low-temperature discharge capacity characteristics at the same time, as in Examples 11 to 15.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electrolyte for a lithium rechargeable battery, comprising:
    a lithium salt;
    a non-aqueous organic solvent;
    a first additive having a Lowest Unoccupied Molecular Orbital (LUMO) level between 0.3 eV and 0.5 eV when calculated by the AM1 (Austin Model 1) method; and
    a second additive having a LUMO level between −0.2 eV and 0.3 eV or between 0.5 eV and 1.0 eV when calculated by the AM1 method.

2. The electrolyte of claim 1, wherein the first additive is at least one compound selected from the group consisting of trimethylsilyl phosphate and lithium tetrafluoroborate.

3. The electrolyte of claim 1, wherein the first additive has a concentration of between 0.01 wt % and 3.0 wt % based on a total weight of the electrolyte.

4. The electrolyte of claim 3, wherein the concentration of the first additive is between 0.2 wt % and 0.5 wt %.

5. The electrolyte of claim 1, wherein the second additive is at least one compound selected from the group consisting of vinylene carbonate and fluoroethyl carbonate.

6. The electrolyte of claim 5, wherein the second additive has a concentration of between 0.01 wt % and 10.0 wt % based on a total weight of the electrolyte.

7. The electrolyte of claim 6, wherein the concentration of the second additive is between 0.1 wt % and 5.0 wt %.

8. The electrolyte of claim 1, wherein a weight ratio of the first additive to the second additive is between 0.1:1 and 1:1.

9. The electrolyte of claim 8, wherein the weight ratio of the first additive to the second additive is between 0.2:1 and 0.5:1.

10. The electrolyte of claim 1, wherein the non-aqueous organic solvent is selected from the group consisting of cyclic carbonate, non-cyclic carbonate, aliphatic carboxylic acid ester, non-cyclic ether, cyclic ether, alkyl phosphate ester and fluorides thereof, or a mixture containing two or more of them.

11. The electrolyte of claim 10, wherein the cyclic carbonate is at least one compound selected from the group consisting of ethylene carbonate, propylene carbonate, butylene carbonate and vinylene carbonate.

12. The electrolyte of claim 10, wherein the non-cyclic carbonate is at least one compound selected from the group consisting of dimethyl carbonate, diethyl carbonate, ethyl methyl carbonate, methyl propyl carbonate, ethyl propyl carbonate, dipropyl carbonate and methyl ethyl carbonate.

13. The electrolyte of claim 10, wherein the aliphatic carboxylic acid ester is at least one compound selected from the group consisting of methyl formate, methyl acetate, methyl propionate and ethyl propionate.

14. The electrolyte of claim 10, wherein the non-cyclic ether is at least one compound selected from the group consisting of gamma-lactones, 1,2-dimethoxyethane, 1,2-diethoxyethane and ethoxymethoxyethane.

15. The electrolyte of claim 10, wherein the cyclic ether is at least one compound selected from the group consisting of tetrahydrofuran and 2-methyltetrahydrofuran.

16. The electrolyte of claim 10, wherein the alkyl phosphate ester is at least one compound selected from the group consisting of dimethyl sulfoxide, 1,2-dioxolan, trimethyl phosphate, triethyl phosphate and trioctyl phosphate.

17. The electrolyte of claim 1, wherein the lithium salt is at least one selected from the group consisting of $LiPF_6$, $LiBF_4$, $LiAsF_6$, $LiClO_4$, $LiCF_3SO_3$, $LiSbF_6$, $LiN(SO_2CF_3)_2$ $LiC_4F_9SO_3$, $LiAlF_4$, $LiAlCl_4$ $LiN(SO_2C_2F_5)_2$, $LiN(C_xF_{2x+1}SO_2)(C_yF_{2y+1}SO_2)$ (wherein, each of x and y is an integer), LiCl and LiI.

18. An electrolyte for a lithium rechargeable battery, comprising:
    a lithium salt;
    a non-aqueous organic solvent;
    a first additive having a Lowest Unoccupied Molecular Orbital (LUMO) level between 0.3 eV and 0.5 eV, when calculated by the AM1 (Austin Model 1) method;

a second additive having an LUMO level between 0.5 eV and 1.0 eV, when calculated by the AM1 method; and a third additive having an LUMO level between −0.2 eV and 0.3 eV, when calculated by the AM1 method.

19. A lithium ion rechargeable battery, comprising:
the electrolyte of claim 1;
a cathode including a cathode active material;
an anode including an anode active material; and
a separator disposed between the cathode and the anode.

20. The lithium ion rechargeable battery of claim 19, wherein the cathode active material is a lithiated intercalation oxide.

21. The lithium ion rechargeable battery of claim 19, wherein the anode active material is selected from the group consisting of crystalline carbon, amorphous carbon, carbon composites and lithium metal.

22. The lithium ion rechargeable battery of claim 21, wherein the anode active material is crystalline carbon that has a crystalline size in the lamination direction (Lc) of 150 Å or more, d(002) of between 3.35 Å and 3.38 Å, real density of 2.2 g/cm$^3$ or more, BET specific surface area of between 0.5 m$^2$/g and 50 m$^2$/g, and average particle diameter (D50) of between 1 μm and 30 μm.

23. The lithium ion rechargeable battery of claim 21, wherein the anode active material has an intensity ratio of I(1360) surface to I(1590) surface in the Raman spectrum [I(1360 cm$^{-1}$)/I(1590 cm$^{-1}$)] of 0.05 or more.

24. A lithium ion rechargeable battery of claim 21, wherein the anode active material has a peak intensity ratio of I(110) surface to I(002) surface in the X-ray diffraction pattern [X(I(110)/I(002))] of less than 0.2.

* * * * *